(12) United States Patent
Raghunathan et al.

(10) Patent No.: US 9,189,450 B2
(45) Date of Patent: Nov. 17, 2015

(54) METHOD AND SYSTEM FOR COLLECTING, ANALYZING AND DISPLAYING FLEET PERFORMANCE DATA

(71) Applicant: Omnitracs, LLC, San Diego, CA (US)

(72) Inventors: Sudarshan Raghunathan, San Diego, CA (US); Chung Hung Lee, San Diego, CA (US); Jeffrey McQuigg, San Diego, CA (US)

(73) Assignee: OMNITRACS, LLC, Dallas, TX (US)

( * ) Notice: Subject to any disclaimer, the term of this patent is extended or adjusted under 35 U.S.C. 154(b) by 303 days.

(21) Appl. No.: 13/623,649

(22) Filed: Sep. 20, 2012

(65) Prior Publication Data

US 2013/0079970 A1    Mar. 28, 2013

Related U.S. Application Data

(60) Provisional application No. 61/538,698, filed on Sep. 23, 2011.

(51) Int. Cl.
*G01M 17/00* (2006.01)
*G06F 17/00* (2006.01)
*G06Q 10/10* (2012.01)

(52) U.S. Cl.
CPC ............ *G06F 17/00* (2013.01); *G06Q 10/10* (2013.01)

(58) Field of Classification Search
USPC ........................ 340/989; 455/566; 701/29.3
See application file for complete search history.

(56) References Cited

U.S. PATENT DOCUMENTS

| | | | |
|---|---|---|---|
| 5,537,590 A * | 7/1996 | Amado | 1/1 |
| 8,065,342 B1 * | 11/2011 | Borg et al. | 707/803 |
| 2002/0194329 A1 | 12/2002 | Alling | |
| 2005/0154769 A1 | 7/2005 | Eckart et al. | |
| 2007/0239346 A1 | 10/2007 | Hawkins et al. | |
| 2008/0027769 A1 * | 1/2008 | Eder | 705/7 |
| 2008/0262882 A1 | 10/2008 | Farrell | |
| 2009/0307031 A1 * | 12/2009 | Winkler et al. | 705/7 |
| 2010/0161408 A1 * | 6/2010 | Karson et al. | 705/14.43 |
| 2011/0040440 A1 * | 2/2011 | de Oliveira et al. | 701/30 |
| 2012/0256770 A1 * | 10/2012 | Mitchell | 340/989 |
| 2013/0079970 A1 * | 3/2013 | Raghunathan et al. | 701/29.3 |

OTHER PUBLICATIONS

EPO: "Notice From the European Patent Office Dated Oct. 1, 2007 Concerning Business Methods", Journal of the European Patent Office—vol. 30, No. 11, Nov. 1, 2007, pp. 592-593, XP007905525, ISSN: 0170-9291.
International Search Report and Written Opinion—PCT/US2012/056680—ISA/EPO—Dec. 6, 2012.

* cited by examiner

*Primary Examiner* — Redhwan k Mawari
(74) *Attorney, Agent, or Firm* — Arent Fox LLP

(57) ABSTRACT

A method and system for collecting, analyzing and displaying fleet performance data are described. An embodiment of the system and method includes receiving a plurality of data streams comprising disparate data, storing, in real-time, the disparate data in a first database, organizing the disparate data stored in the first database into an organized structure in a second database, the data in the second database organized according to a predefined parameter, exposing the organized data in the second database as a subset of data stored in a third database, querying the subset of data in the third database according to a script, the script configured to associate the subset of data according to the predefined parameter, and providing the associated subset of data in the third database to an analysis engine configured to display the associated subset of data from a perspective defined by the predefined parameter.

19 Claims, 15 Drawing Sheets

|  | Entity | Group Avg | Fleet Avg |
|---|---|---|---|
| Miles Driven | 15,903 | 6,917 | 5,780 |

Compliance — 714

Compliance Score: -158%

Select Driver's Default Ruleset: US [Go]

| Metric | Entity | | Group Avg | | Difference (%) | | Fleet Avg | | Difference (%) | |
|---|---|---|---|---|---|---|---|---|---|---|
|  | Counts | Time | Counts | Time | Counts | Time | Counts | Time | Counts | Time |
| Driving | 1 | 8 | 0.150 | 1.300 | -567% | -515% | 0.109 | 1.901 | -818% | -321% |
| On Duty | 1 | 11 | 0.150 | 1.050 | -567% | -948% | 0.327 | 9.931 | -206% | -11% |
| Cumulative On Duty | 0 | 0 | 0.700 | 44.550 | 0% | 0% | 0.554 | 37.663 | 100% | 100% |
| Off Duty Driving | 4 | 81 | 2.000 | 37.950 | -100% | -113% | 2.109 | 36.653 | -90% | -121% |
| # Log Edits | 10 | 0 | 8.900 | 0.000 | -12% | 0% | 10.901 | 0.000 | 8% | 0% |

Download

Efficiency — 718

Efficiency - Geo Score: 66%

|  | Entity | Group Avg | Difference (%) | Fleet Avg | Difference (%) |
|---|---|---|---|---|---|
| # of Customer Stops | 3 | 0.400 | -650% | 0.218 | -1,277% |
| # Exceeded Stoppage Time Stops | 0 | 0.000 | 0% | 0.020 | 100% |
| Avg Exceeded Stoppage Time | 0 | 0.000 | 0% | 10.688 | 100% |
| # Exclusion Zone Violations | 0 | 0.000 | 0% | 0.000 | 0% |

Download

Exceeded Stoppage Time Details - Geo
Exclusion Zone Violations - Geo

FROM FIG. 7A

FIG. 7B

METHOD AND SYSTEM FOR COLLECTING, ANALYZING AND DISPLAYING FLEET PERFORMANCE DATA

CLAIM OF PRIORITY UNDER 35 U.S.C. §119

The present Application for Patent claims priority to Provisional Application No. 61/538,698 entitled "METHOD AND SYSTEM FOR COLLECTING, ANALYZING AND DISPLAYING FLEET PERFORMANCE DATA", filed Sep. 23, 2011, and assigned to the assignee hereof and hereby expressly incorporated by reference herein.

DESCRIPTION OF THE RELATED ART

Systems for tracking, managing and maintaining a fleet of portable assets generally includes one or more systems for monitoring the location of the portable asset and one or more systems for monitoring the performance of the portable asset. A system for monitoring the location of the portable asset may include a radio transmitter, a global positioning system (GPS) device, a terrestrial-based communication system such as a cellular network, or another type of communication device capable of periodically or continuously reporting its geographic location and other metrics relating to the portable asset to a receiving device. A system for monitoring the performance of the portable asset may include a number of sensors that collect and report vehicle performance data and a user interface for monitoring operator interaction with the portable asset.

In an asset tracking application, it is desirable to be able to compare the performance of a fleet of vehicles with an overall industry average or benchmark for one or more performance parameters or metrics. An owner of such a fleet of portable assets may wish to compare the performance of their fleet against the performance of a similarly situated fleet, or against parts of the industry, or even the industry as a whole. One of the challenges in being able to compare the performance of a fleet against the performance of a similarly situated fleet, or against parts of the industry, or even the industry as a whole is that data that is collected relative to the performance of the portable asset and the operator of the portable asset is disparate and generally not collated so that drawing comparisons and distinctions relative to one fleet is difficult.

An operator of a network that serves many different fleets of vehicles where each fleet includes many vehicles may have an abundance of data relating to vehicle performance parameters. These performance parameters and metrics are obtained from data relating to each vehicle in a fleet of vehicles, each driver, and other parameters. The data is disparate in nature in that the data may relate to a vehicle, a driver, or another entity. Further, the data is typically received from a number of different sources in a real-time manner. Unfortunately, while a single entity generally can compare a vehicle's performance against other vehicles in the same fleet, there is no way for a single fleet operator to compare their fleet against the performance of the overall industry, or subsets of the overall industry. One of the challenges is receiving, organizing and having access to the relevant data and the ability to choose the relevant data to present to a user. Therefore, it would be desirable to have the ability to collect and analyze performance data in such a way that the comparing of a particular fleet against the performance of a similarly situated fleet, or against parts of the industry, or even the industry as a whole is possible.

SUMMARY

A method and system for collecting, analyzing and presenting fleet performance data are described. In an embodiment, the method includes receiving a plurality of data streams comprising disparate data, storing, in real-time, the disparate data in a first database, organizing the disparate data stored in the first database into an organized structure in a second database, the data in the second database organized according to a predefined parameter, exposing the organized data in the second database as a subset of data stored in a third database, querying the subset of data in the third database according to a script, the script configured to associate the subset of data according to the predefined parameter, and providing the associated subset of data in the third database to an analysis engine configured to display the associated subset of data from a perspective defined by the predefined parameter.

In an embodiment, the system includes a plurality of data streams comprising disparate data, a first database for storing, in real-time, the disparate data, a second database for storing the disparate data in the first database in an organized structure, the data in the second database organized according to a predefined parameter, a third database for storing the data in the second database as a subset of data, a script for querying the subset of data in the third database, the script configured to associate the subset of data according to the predefined parameter, and an analysis engine configured to display the associated subset of data from a perspective defined by the predefined parameter. Other systems are also provided.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIGS. 7A and 7B are a graphical illustration showing a driver performance scorecard provided by the analytics manager on the terminal device of FIG. 2.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
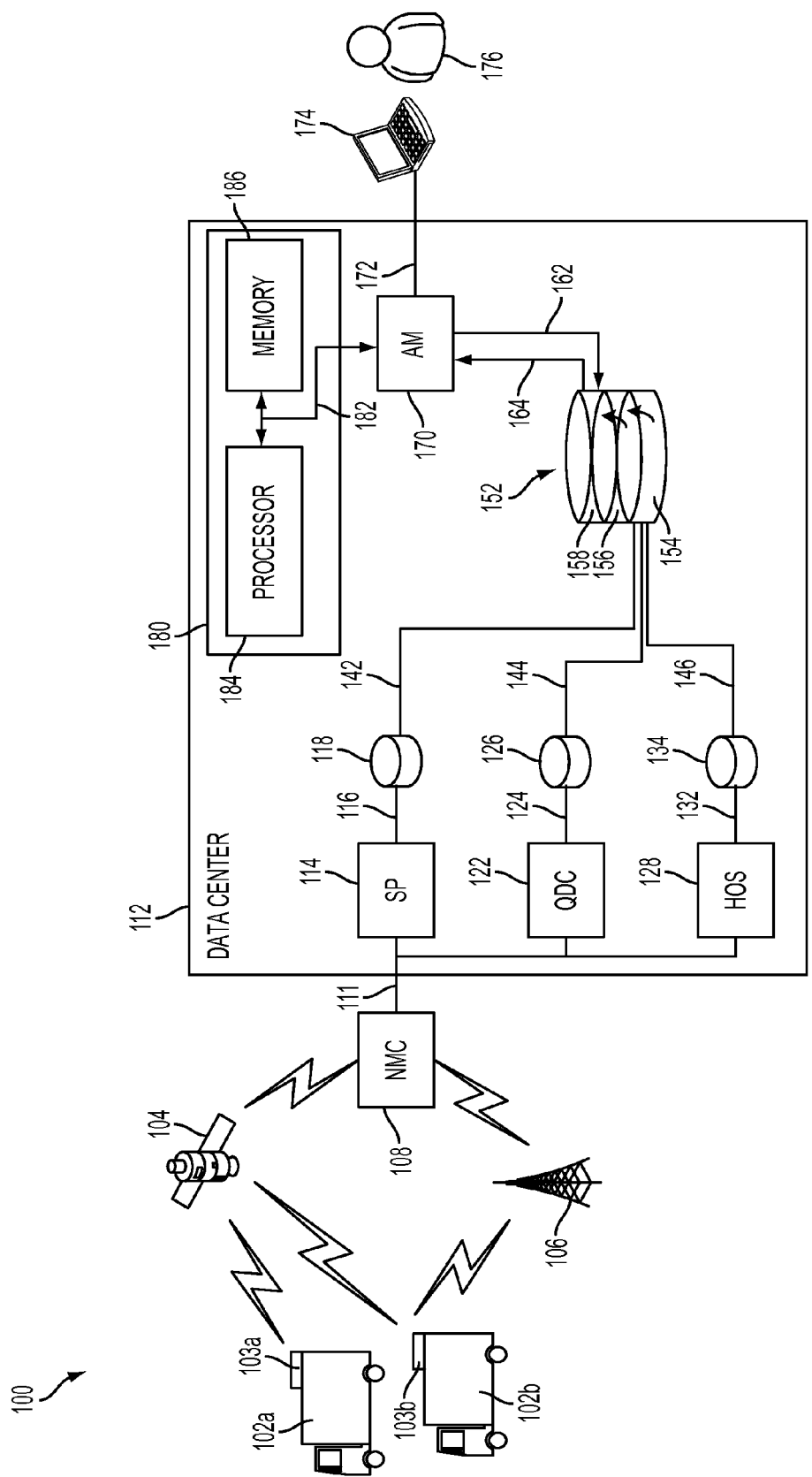
FIG. 1 is a functional block diagram illustrating exemplary elements of a system for collecting, analyzing and presenting fleet performance data.

FIG. 1 is a functional block diagram illustrating exemplary elements of a system for collecting, analyzing and presenting fleet performance data. In an embodiment, the system 100 includes fleets of vehicles, each fleet having at least one vehicle. However, typically, a fleet could include many tens, hundreds or thousands of vehicles. An example fleet is illustrated as having vehicles 102a and 102b. Additional fleets (not shown) are contemplated, but not shown. Each vehicle 102 is capable of bi-directional communication using, for example, a bi-directional communications module 103. The bi-directional communications module 103 may include, for example, the capability for satellite communication, terrestrial communication, radio frequency (RF) communication and other communication methodologies. As an example only, each vehicle 102 is in bi-directional communication with a network management center (NMC) 108 over at least one communication channel. In the example shown in FIG. 1, each vehicle 102 is in bi-directional communication with the NMC 108 over a satellite-based communication system 104 and a terrestrial-based system 106. A satellite communication system 104 and a terrestrial-based communication system 106 are known to those skilled in the art. Depending on many factors, data may be exchanged with the vehicles 102 using any combination of the satellite communication system 104 and the terrestrial-based communication system 106. In an embodiment, many different types of data are collected and transferred from the vehicles 102 to the NMC 108. Examples of such data include, but are not limited to, driver performance data, driver duty status, truck performance data, critical events, messaging and position data, location delivery data, and many other types of data. All of the information that is communicated to and from the vehicles 102 is processed via the NMC 108. The NMC 108 can be thought of as a data clearinghouse that receives all data that is transmitted to and received from the vehicles 102.

The system 100 also includes a data center 112. The data center 112 illustrates one possible implementation of a central repository for all of the data received from each of the vehicles 102. As an example, as mentioned above many different types of data are transmitted from the vehicles 102 to the NMC 108. All of this data is transmitted via connection 111 to the data center 112. The connection 111 may comprise any wired or wireless dedicated connection, a broadband connection, or any other communication channel configured to transport the data.

In an illustrative embodiment, the data center 112 comprises a number of application servers and data stores. Details of the operation of the application servers and data stores are omitted as they are known to those skilled in the art. Although not specifically mentioned, each application server and data store includes a processor, memory including volatile and non-volatile memory, operational software, a communication bus, an input/output mechanism, and other operational systems as known in the art.

For example only, a first application server is referred to as a services portal (SP) server 114. The services portal server 114 receives, for example, messaging and positioning (M/P) data and/or location delivery efficiency (LDE) data and communicates this data over connection 116 to a data store 118. The data store 118 stores the M/P data and the LDE data.

Another application server is referred to as the quick deployment center (QDC) server 122. The quick deployment center server 122 receives, for example, critical event (CE) data from each of the vehicles 102. This data is transmitted over connection 124 and stored in a data store 126.

Another application server is referred to as the hours of service (HOS) server 128. The HOS server 128 receives data related to, for example, duty status (DS) data such as the number of hours that a driver operates a vehicle 102. This data is transferred over connection 132 and stored in the data store 134. Importantly, each of the data stores 118, 126 and 134 receive real-time disparate data from the NMC 108. The term "disparate" refers to the nature of the different types of data. This real-time disparate data is communicated to a data warehouse 152. The data store 118 communicates with the data warehouse over connection 142, the data store 126 communicates with the data warehouse 152 over connection 144 and the data store 134 communicates with the data warehouse 152 over connection 146. Importantly, each of the data transmitted over respective connections 142, 144 and 146 represent disparate data that is communicated to the data warehouse 152. It should be mentioned that although all shown as residing in the data center 112, each of the servers 114, 122 and 128 may reside in other locations and be operatively coupled to the data store 152 in a distributed manner. Further, more or fewer servers may be associated with the data center 112.

In an embodiment, the data warehouse 152 is organized in a multiple-database structure. In the example shown herein, the data warehouse 152 is organized into three different databases. A first database is referred to as the "stage" 154, a second database is referred to as the "operational data store (ODS)", and a third database 158 is referred to as a "data mart." Additional details of the organization of the data warehouse 152 will be described below.

The data warehouse 152 communicates with an application referred to herein as an "analytics manager" 170. In an embodiment, the analytics manager 170 implements a set of routines that query the data mart 158 over connection 162 and that receives data from the data mart 152 over connection 164. The analytics manager 170 captures and provides this data in a usable format over connection 172 for display on a terminal device 174. In an embodiment, the analytics manager 170 is an analysis engine and is associated with an execution system 180 over a system bus 182. In an embodiment, the execution system 180 includes a processor 184 and a memory 186. The memory can store the routines that are associated with the analytics manager 170. In an embodiment, the processor 184 can execute the stored routines to implement the functionality of the analytics manager 170 that are described herein. Although shown as residing within the data center 112, the execution system 180 may reside elsewhere, and indeed may be implemented as a distributed system in which the memory 186 and the processor 184 are located in different places. The terminal device 174 can be a user interface portal, a web-based interface, a personal computer (PC), a laptop, a personal data assistant (PDA), a dedicated terminal, a dumb terminal, or any other device over which a user 176 can view the display provided by the terminal device 174.

Figure 2:
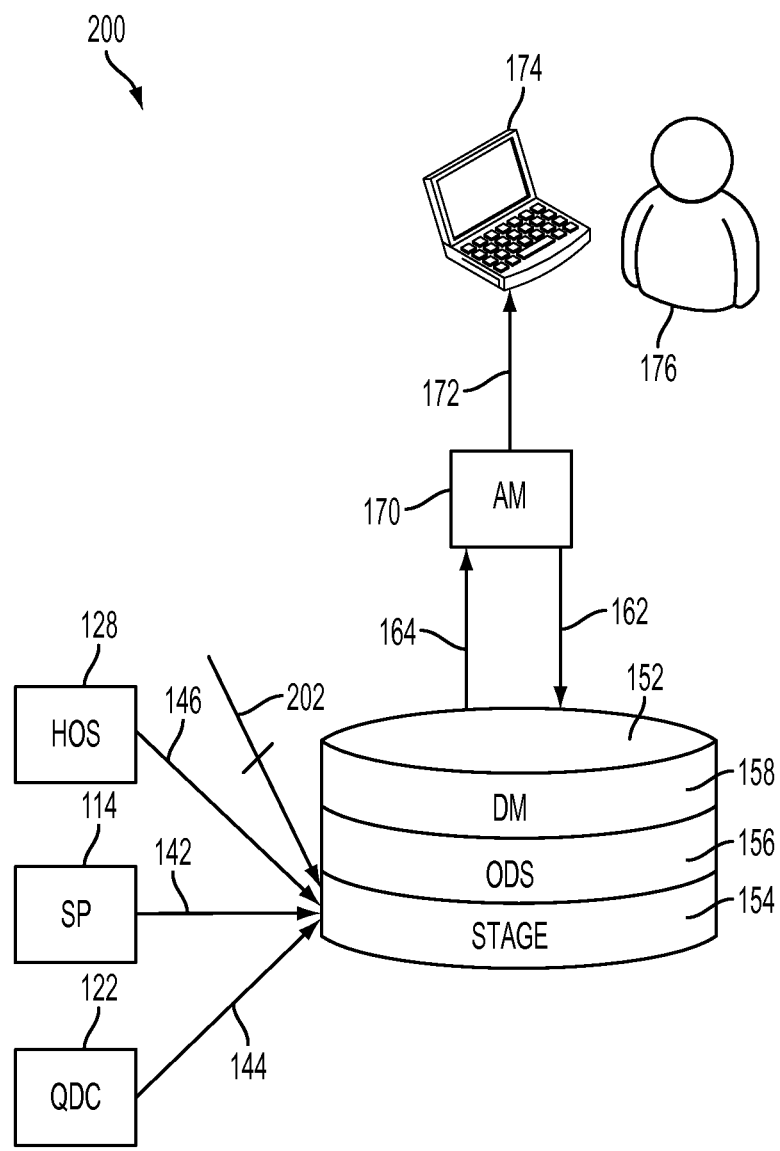
FIG. 2 is a schematic diagram illustrating in additional detail the organization of the data warehouse of FIG. 1.

FIG. 2 is a schematic diagram illustrating in additional detail the organization of the data warehouse 152 of FIG. 1. As mentioned above, disparate data from the services portal server 114, quick deployment center server 122 and the hours of service server 128 are provided over respective connections 142, 144 and 146 to the stage 154. In addition, other real-time data are provided to the stage 154 over connection 202. The examples of data provided herein are exemplary only. It should be mentioned that any data relating to fleet performance, vehicle performance, driver performance, location delivery performance, fuel efficiency, and a number of other fleet vehicle performance parameters are all communicated to the stage 154 in real-time. All of the data received is replicated and updated in real-time in the stage 154.

The data in the stage 154 is then operated on and organized into the operational data store 156 according to one or more scripts. As used herein, the term "script" refers to an instruction that provides information on how to organize and format data. As an example, a script provided by the operational data store 156 to the stage 154 is used to organize the data in the stage 154 into a format that is used in the operational data store 156. The disparate data in the stage 154 is organized into a particular organized data structure in the ODS 156. As an example, the organized data structure in the ODS 156 may be one that associates the disparate data with a predefined parameter, such as a particular driver, vehicle, event, etc.

An example of a script that loads critical event (CE) data from the stage 154 to the ODS 156 follows. As an example, six (6) critical event data entries (e.g., hard braking, stability, lane departure, manual, lane departure disable, following time violation) are identified in the stage 154. A vehicle is then identified in the ODS 156 using, for example, a unique identifier such as a unified address (UA) that is associated with each bi-directional communications module 103 (FIG. 1). Then, the driver corresponding to the identified CE data entries is located by examining, for example, the HOS data events ((on-duty, off duty driving, driving)/SP driver login event). Data relating to the vehicle speed can also be located in the stage 154 and placed in the ODS 156 and associated with that driver/event.

Once data is organized in the ODS 156, the data mart 158 can provide a script that exposes relevant data in the ODS 156 and provides the data as a subset of the data in the ODS 156 in a further organized format in the data mart 158. An example of a script that loads critical event (CE) data from the ODS 156 to the data mart 158 follows. As an example, a subset of four (4) critical event data entries (hard braking, stability, lane departure, manual) are identified in the ODS 156 and placed into a fact table in the DM 158. Then, unique customer/vehicle/driver identification is used to identify the vehicles and drivers corresponding to the collected CE event data. The relevant CE event data are then loaded into the DM 158. Group and fleet metrics are computed by aggregating information from the fact table in the data mart 158. Industry level metrics are computed by aggregating information from event tables in the ODS 156.

Once relevant data is available in the data mart 158, and in accordance with an embodiment of the system and method for collecting analyzing and displaying fleet performance data, the analytics manager 170 develops and delivers a query over connection 162 to the data mart 158. The query is developed based on input from the user 176. For example, if the user 176 wishes to see a report relating to a particular driver, then the query would be developed to provide the desired report. This data is provided over connection 164. The analytics manager 170 then formats and displays the requested data over the terminal device for 174 for viewing by the user 176.

An example query from the analytics manager 170 to the data mart 158 follows. This example shows an example query that queries CE data entries for a specific driver/vehicle. The analytics manager 170 develops and provides a query script to the data mart 158. In an embodiment, the query can be in the form of an Oracle Business Intelligence Enterprise Edition (OBIEE) query. The query script retrieves all the CE data entries for a single driver, identified by a unique driver ID. In this example, the single driver ID can be thought of as the predefined parameter so that the CE data entries are associated with a particular driver. These CE data entries can be of different types as mentioned above and can include, as a non-limiting example, hard braking, stability, lane departure, manual, etc. Once this result set is returned from the data mart query, the information is organized and displayed as part of the safety section (e.g., 512 in FIGS. 5A and 5B below) of the driver performance dashboard.

The disparate data in the stage 154 can comprise vehicle-centric data, driver-centric data, or any other data and the subset of data in the data mart 158 is presented from a vehicle-centric performance perspective, a driver-centric performance perspective, or another perspective. Further, the disparate data is received in the stage 154 in real-time, and can be reviewed over time. The analytics manager 170 manages the association between vehicle-centric performance data and driver-centric performance data by providing the requested information in a view that corresponds to the view requested by a user.

In an embodiment, a subset of any of the vehicle-centric performance data and the driver-centric performance data can be compared against a larger sample of the vehicle-centric performance data and the driver-centric performance data to determine a performance metric of the subset of the vehicle-centric performance data and the driver-centric performance data. In this manner, driver performance, vehicle performance, or other data relating to a driver, a vehicle, or driver and/or vehicle information relating to a fleet of vehicles can be compared against data relating to a larger group, such as an industry. Further, the comparison of the subset of the vehicle-centric performance data and the driver-centric performance data with industry data is customizable based on user input.

Figure 3:
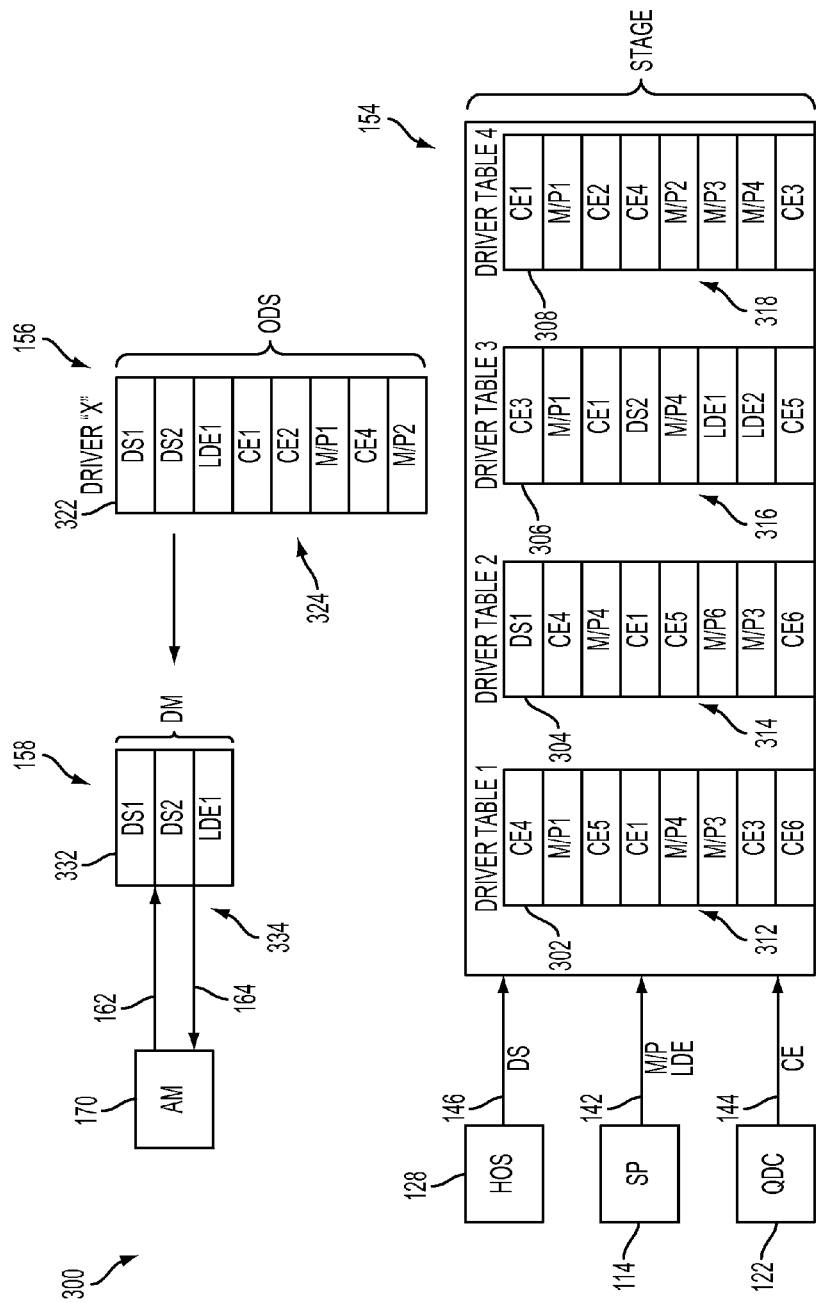
FIG. 3 is a graphical example showing the organization of the data provided to the data warehouse of FIG. 2.

FIG. 3 is a graphical example showing the organization of the data provided to the data warehouse 152 of FIG. 2. As mentioned above, disparate data is provided from the SP server 114, the QDC server 122 and the HOS server 128 to the stage 154. For example purposes only, the stage 154 is illustrated in FIG. 3 as comprising four tables of driver data. The four driver tables 302, 304, 306 and 308 are illustrated for example purposes only, whereas the stage 154 include many other tables having all of the disparate data. In addition to data relating to a particular vehicle 102 (FIG. 1) and a particular fleet, the data stored in the stage 154 represents all of the data available for a particular industry.

Each driver table 302, 304, 306 and 308 includes respective data entries 312, 314, 316 and 318. In the example shown, each data element in the data entries relates to one of the four types of data used in the example of FIG. 3. For example, in driver table 1, the entry "CE 4" refers to critical event data, and specifically refers to the fourth element of critical event data received by the stage 154. Each data element is numbered consecutively for ease of explanation. As an example, driver table 1 302 also includes a critical event (CE) data element "CE 1" as does each of the other driver tables 304, 306 and 308. The illustration of each data entry is meant to show the random and real-time nature of the way data is loaded into the stage 154.

In accordance with an example script that organizes the data in the stage 154 into the operational data store 156, the operational data store 156 is illustrated as including a driver table 322. However, the driver table 322 in this example refers to a particular driver, referred to as driver "x". All of the data contained in driver table 322 relates to a particular driver. Driver table 322 includes data entries 324. The data entries 324 are selected from the driver tables 302, 304, 306 and 308 according to the example script. In this instance, the script implemented by the ODS 156 pulls data events from those data entries 312, 314, 316 and 318 that relate to a particular driver, in this case driver "x", and places those data entries in the table 322. In this manner, the raw data in the stage 154 is now organized in the ODS 156 in a manner in which any data that pertains to, in this case, a particular driver is now shown and available to the data mart 158 in the table 322. In this example, this organizational structure allows data relating to the driver "x" in table 322 to be compared against other drivers and other parameters so as to be able to compare a particular entity (in this case, driver "x") against the entire industry, fleet, or other entity.

In accordance with an embodiment of the method and system for collecting analyzing and displaying fleet performance data, the data mart 158 includes a fact table 332 having data entries 334. The data entries 334, in particular, the selected data entries "DS1," "DS2," and "LDE1" are a subset of the data entries 324 in the table 322 in the ODS 156. The script implemented by the data mart 158 that loads data from the ODS 156 to the data mart 158 allows data optimization and a way of exposing relevant ODS data in the data mart 158 in an efficient way for querying and reporting. In this example, the entries 334 "DS1," "DS2," and "LDE1" are the relevant entries.

In an embodiment, the analytics manager 170 develops and sends its query over connection 162 to the data mart 158, so as to obtain the data entries 334, which are then provided over connection 164 to the analytics manager 170 to be displayed by the terminal device 174.

Figure 4:
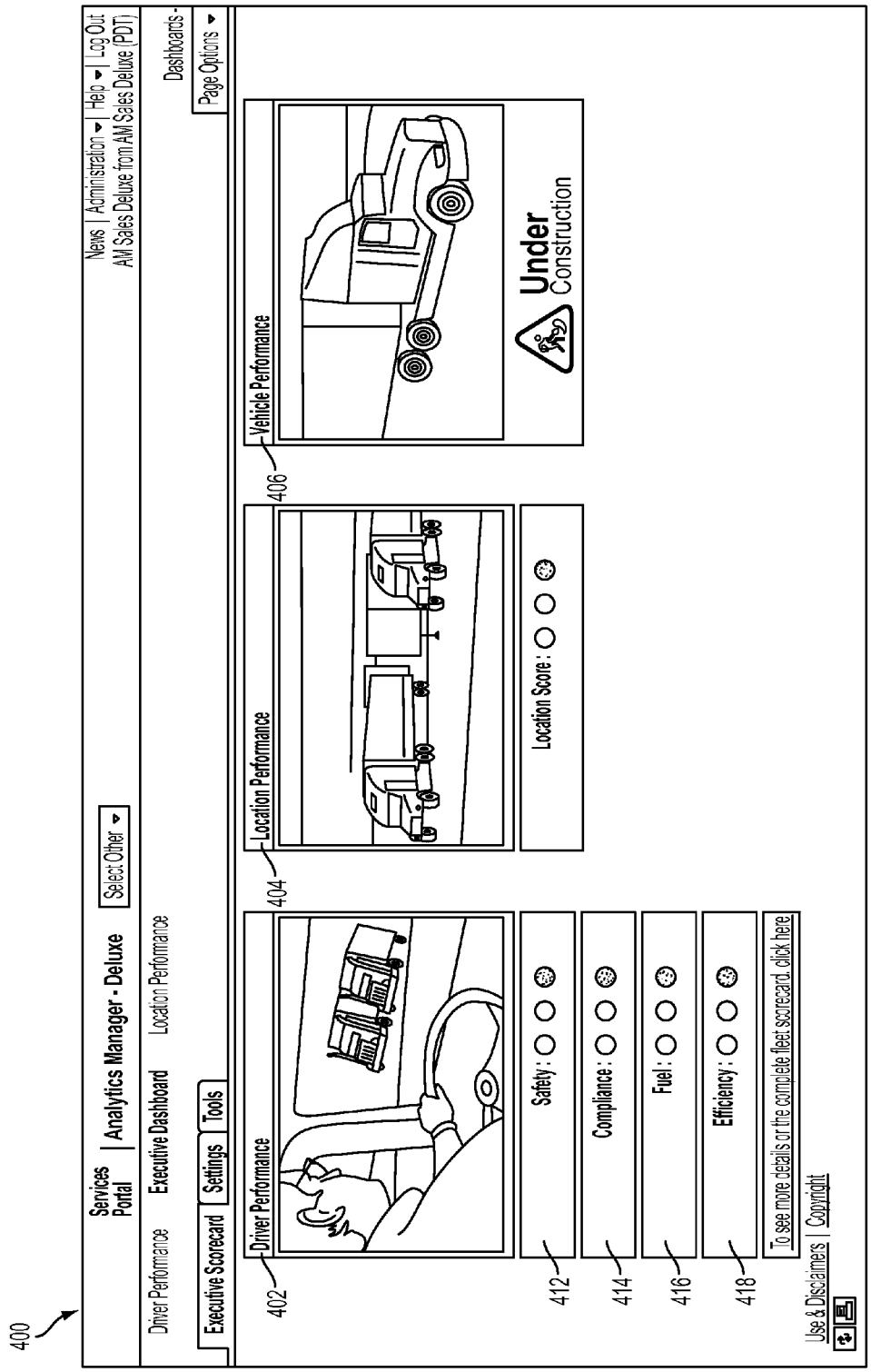
FIG. 4 is a graphical illustration showing a display screen available to a user.

FIG. 4 is a graphical illustration 400 showing a display screen available to a user 176. The analytics manager 170 provides this display over the terminal device 174, which in this example provides an executive dashboard view to the user 176. In the example shown in FIG. 4, the executive dashboard view includes a driver performance window 402 a location performance window 404 and a vehicle performance window 406.

The driver performance window 402 comprises a safety view 412, a compliance view 414, a fuel view 416 and an efficiency view 418. The data that is initially stored in the stage 154 and that eventually becomes available in the data mart 158 is used by the analytics manager 170 to generate a variety of user interface views and screens that include driver performance information, location performance information and vehicle performance information.

Figure 5A:
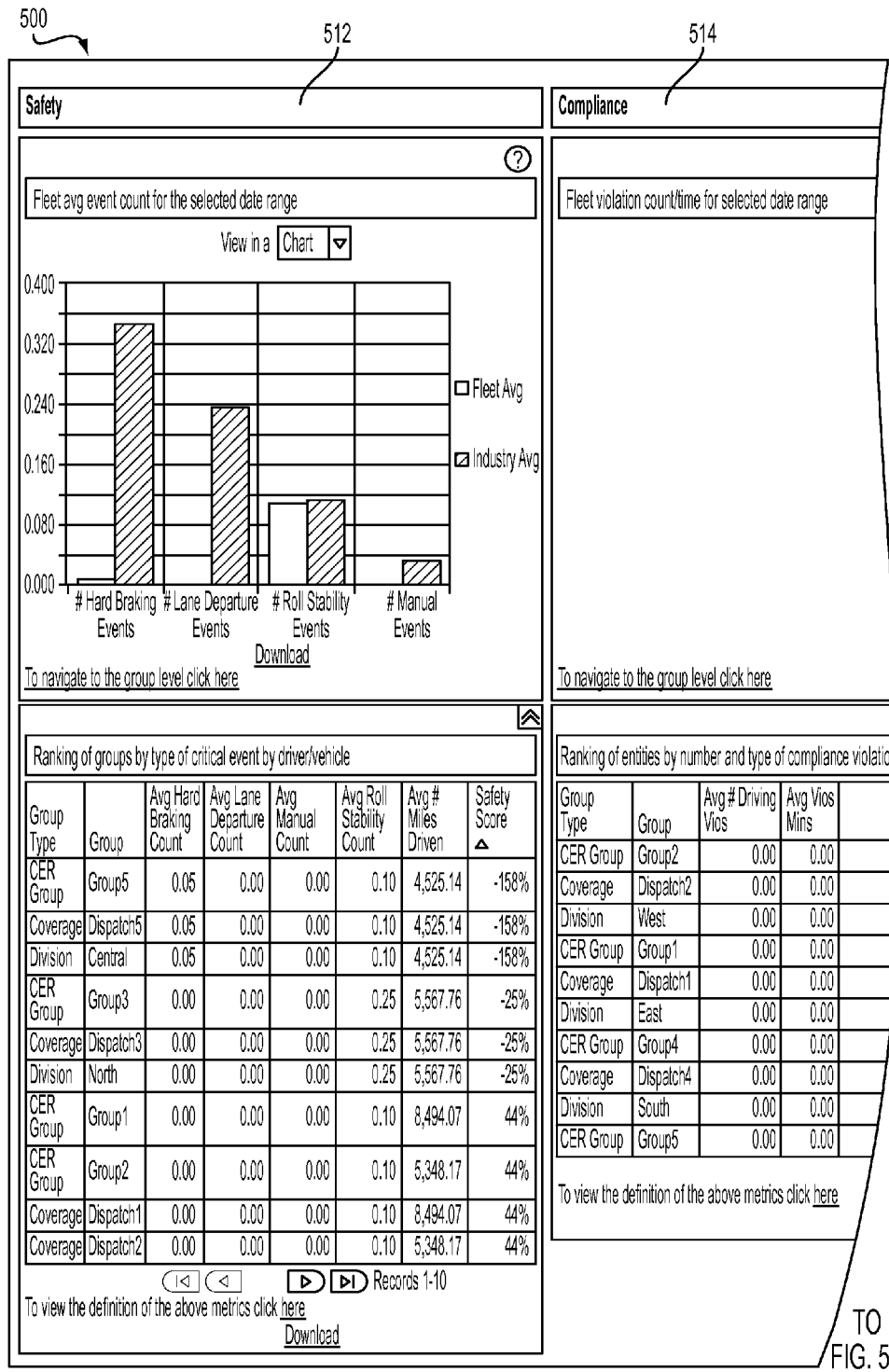
FIGS. 5A and 5B are a graphical illustration showing further detail of the safety view and the compliance view provided by the analytics manager on the terminal device of FIG. 2.
Figure 5B:
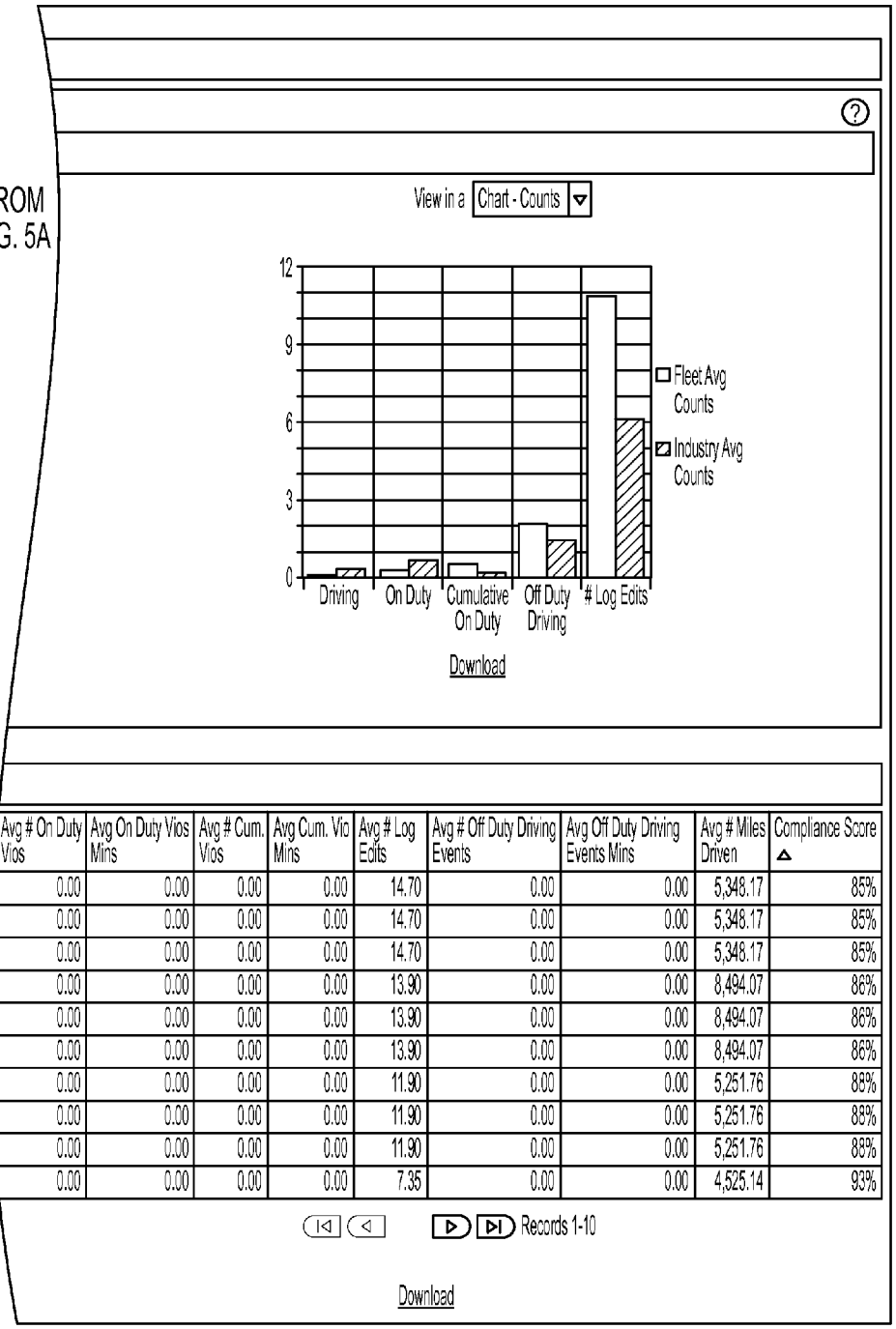

FIGS. 5A and 5B are a graphical illustration 500 showing further detail of the safety view 512 and the compliance view 514 provided by the analytics manager 170 on the terminal device 174. The safety view 512 and the compliance view 514 correspond to the safety view 412 and the compliance view 414 illustrated in FIG. 4. However, in FIGS. 5A and 5B, the safety view 512 shows a fleet average event count for a selected date range and the compliance view 514 illustrates a fleet violation count and time for the selected date range. This illustrates driver performance as it relates to safety and compliance.

Figure 6A:
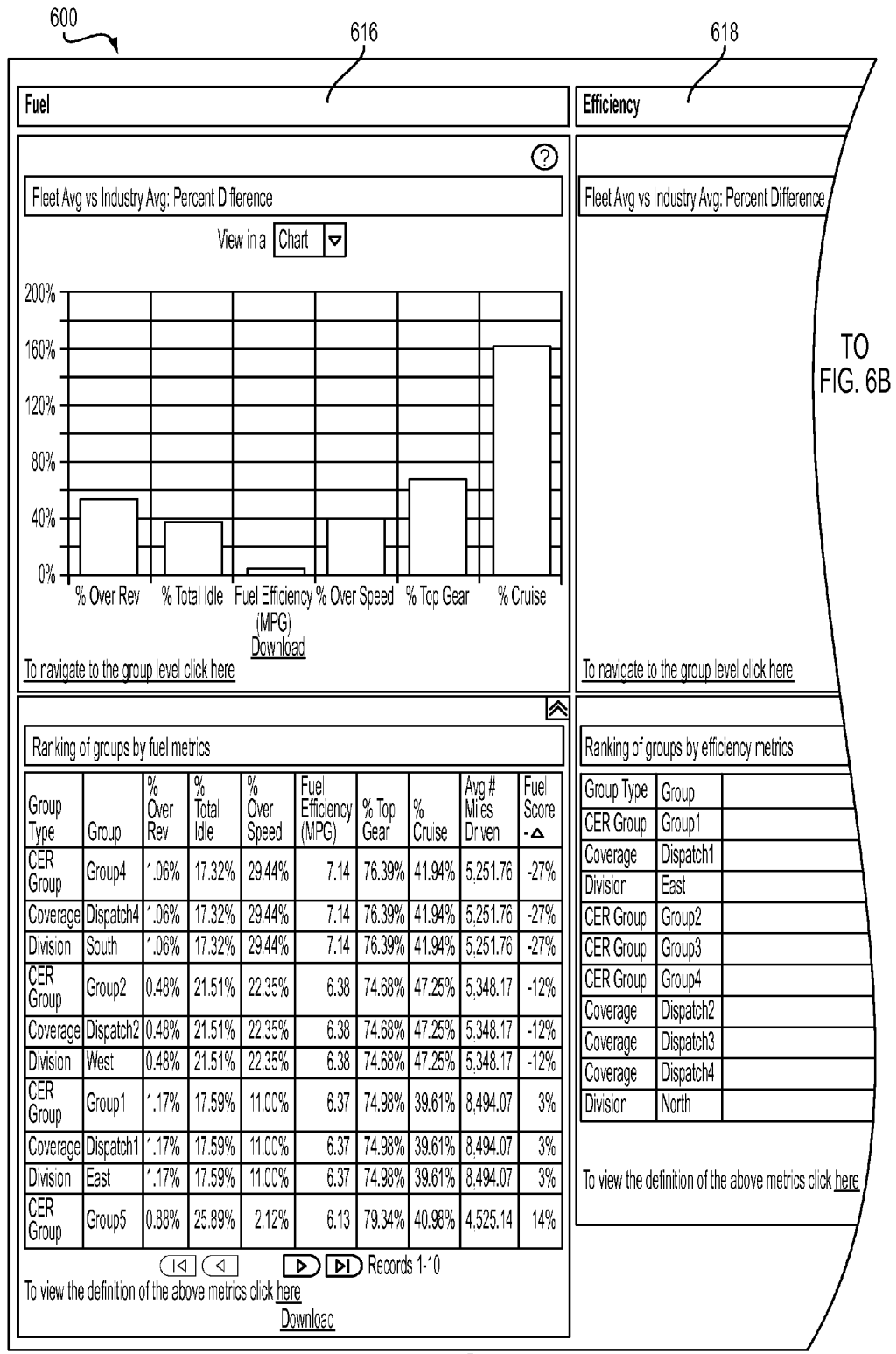
FIGS. 6A and 6B are a graphical illustration showing further detail of the fuel view and the efficiency view provided by the analytics manager on the terminal device of FIG. 2.
Figure 6B:
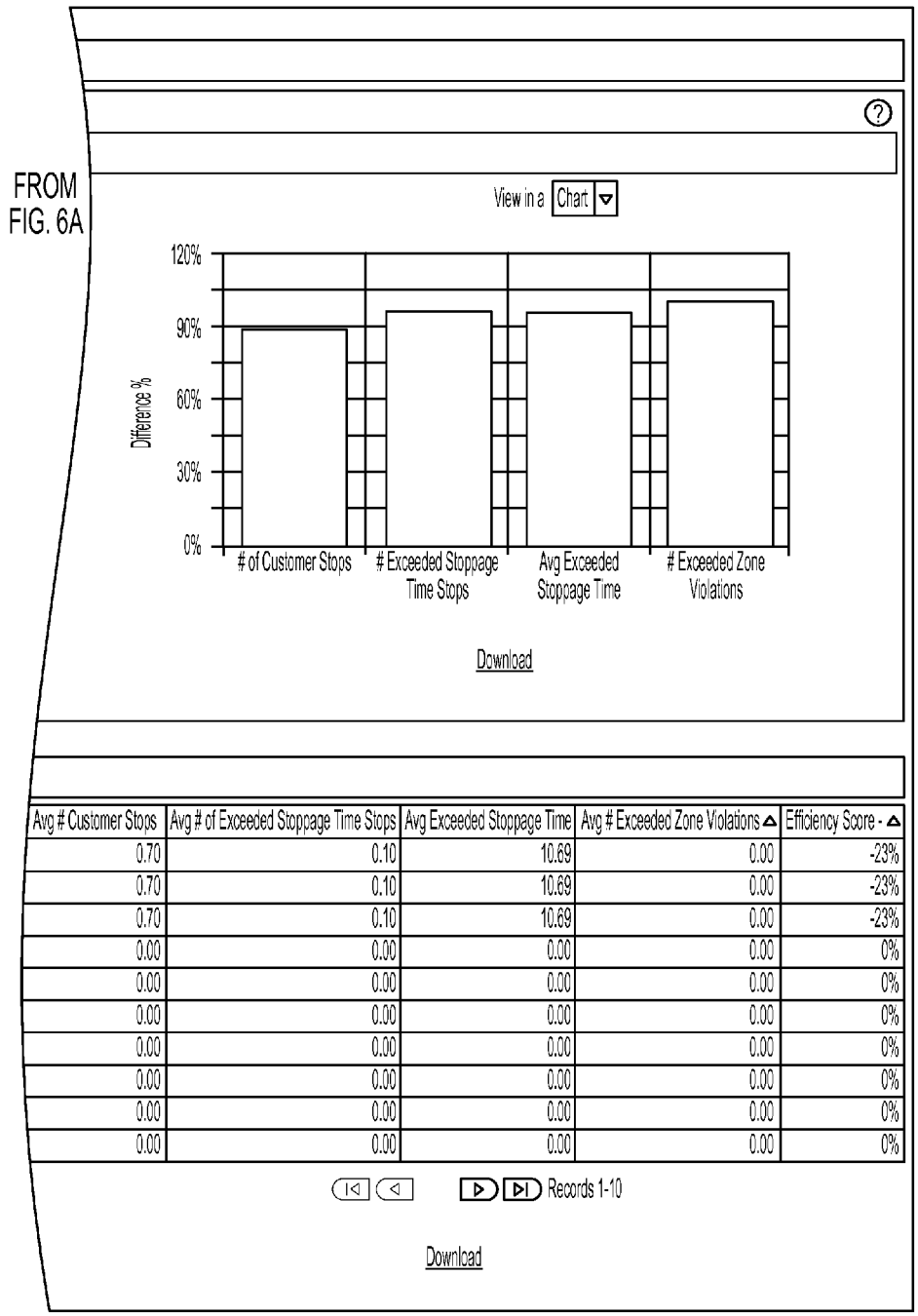

FIGS. 6A and 6B are a graphical illustration 600 showing further detail of the fuel view 616 and the efficiency view 618 provided by the analytics manager 170 on the terminal device 174. The fuel view 616 and the efficiency view 618 corresponds to the fuel view 416 and the efficiency view 418 shown in FIG. 4. In FIGS. 6A and 6B, the fuel view 616 illustrates a fleet average versus an industry average as a percent difference, and the efficiency view 618 shows a fleet average versus industry average with a percent difference. In this manner, a particular fleet can be compared against an industry average for the illustrated parameters.

Figure 7A:
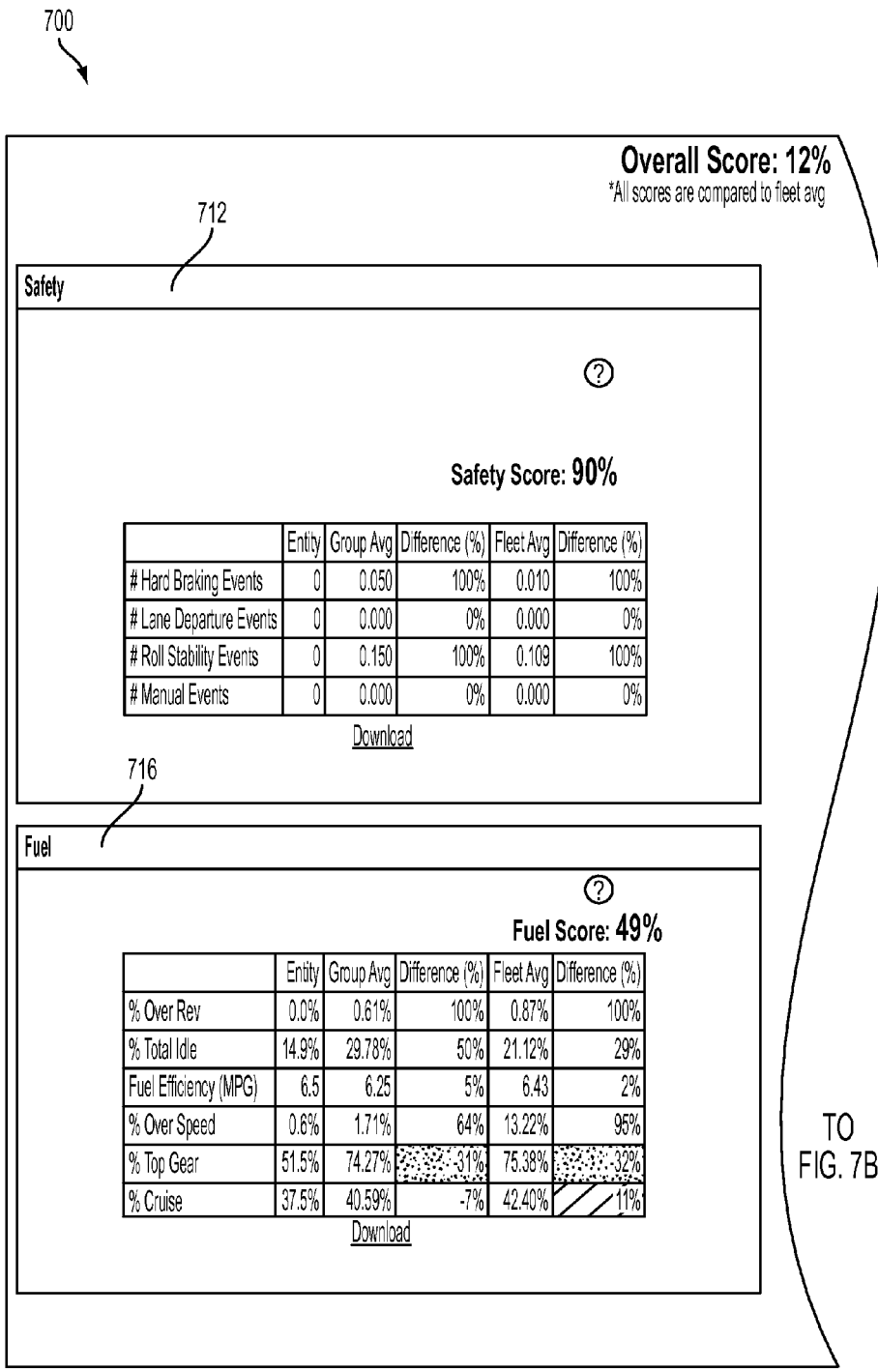

FIGS. 7A and 7B are a graphical illustration 700 showing a driver performance scorecard provided by the analytics manager 170 on the terminal device 174. The driver performance scorecard is shown in the context of a safety view 712, a compliance view 714, a fuel view 716, and an efficiency view 718, and provides a driver score for each view, in this example, the driver score shown as a percentage.

Figure 8A:
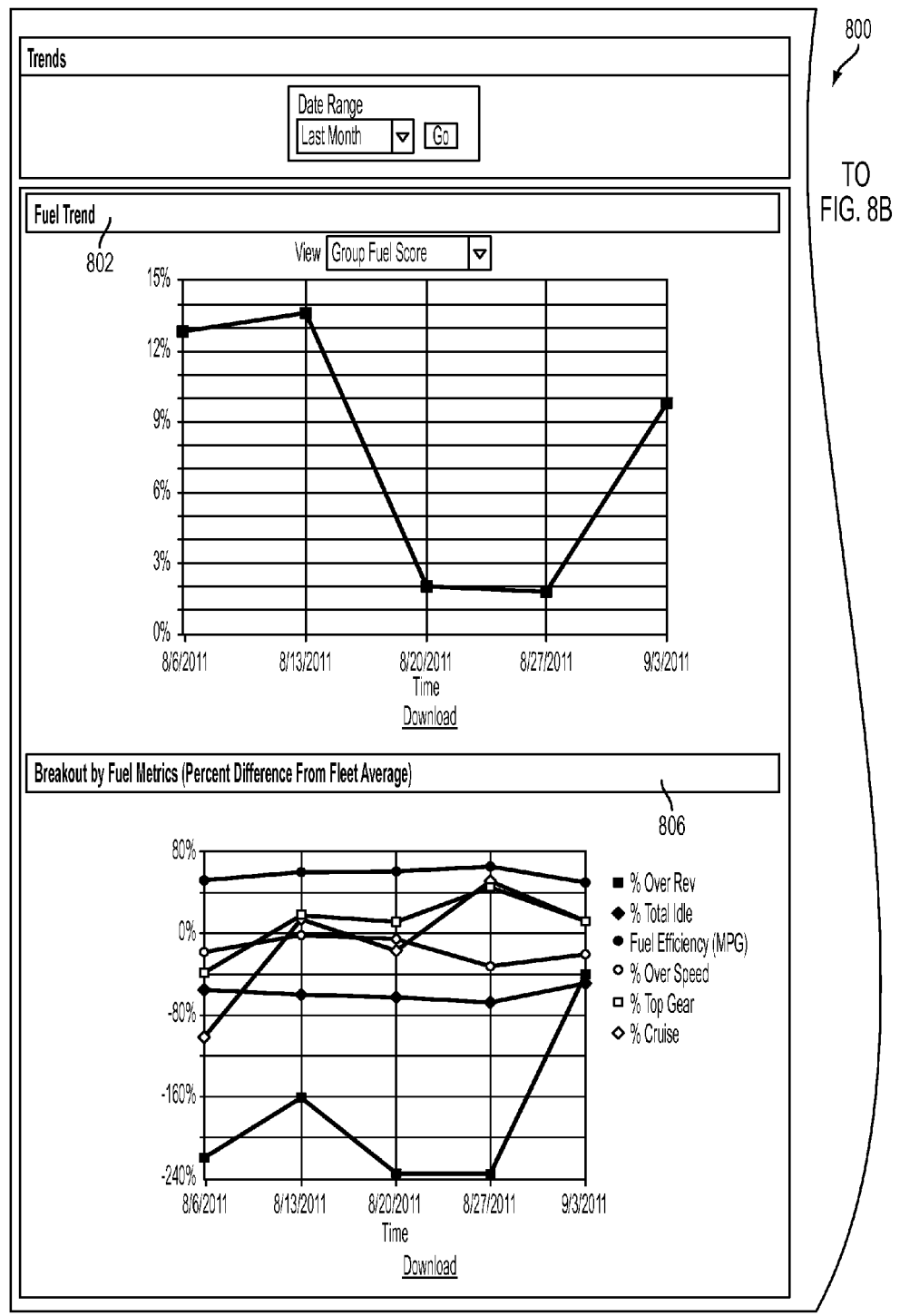
FIGS. 8A and 8B are a graphical illustration showing a fuel summary window provided by the analytics manager on the terminal device of FIG. 2.
Figure 8B:
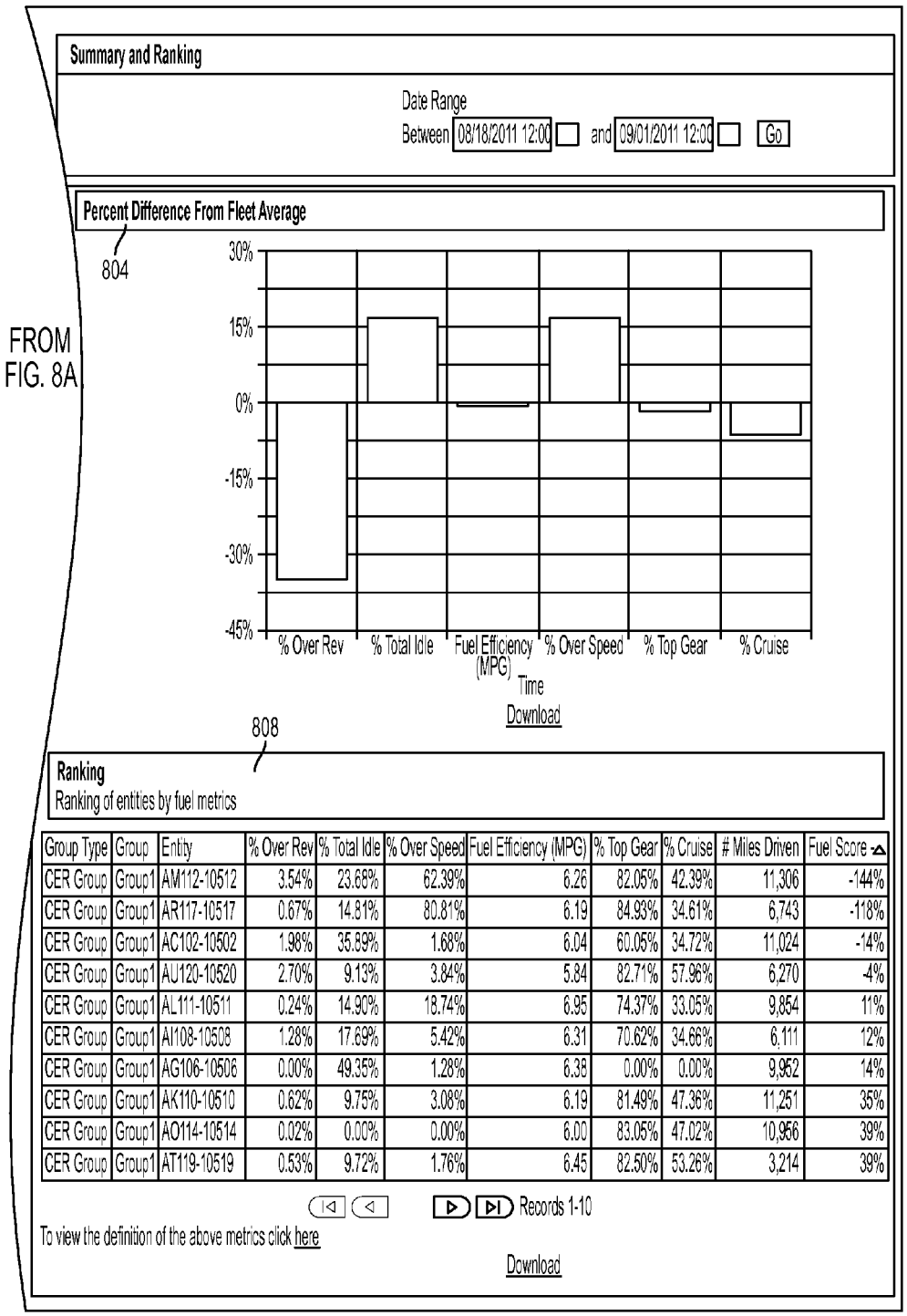

FIGS. 8A and 8B are a graphical illustration 800 showing a fuel summary window provided by the analytics manager 170 on the terminal device 174. The fuel summary window provides various informational data points regarding fuel consumption and fuel usage, and compares a particular driver and fleet against an industry average. The fuel summary window includes a fuel trend view 802, a percent difference from fleet average view 804, a breakout by fuel metrics as a percent difference from fleet average view 806 and a ranking view 808.

Figure 9A:
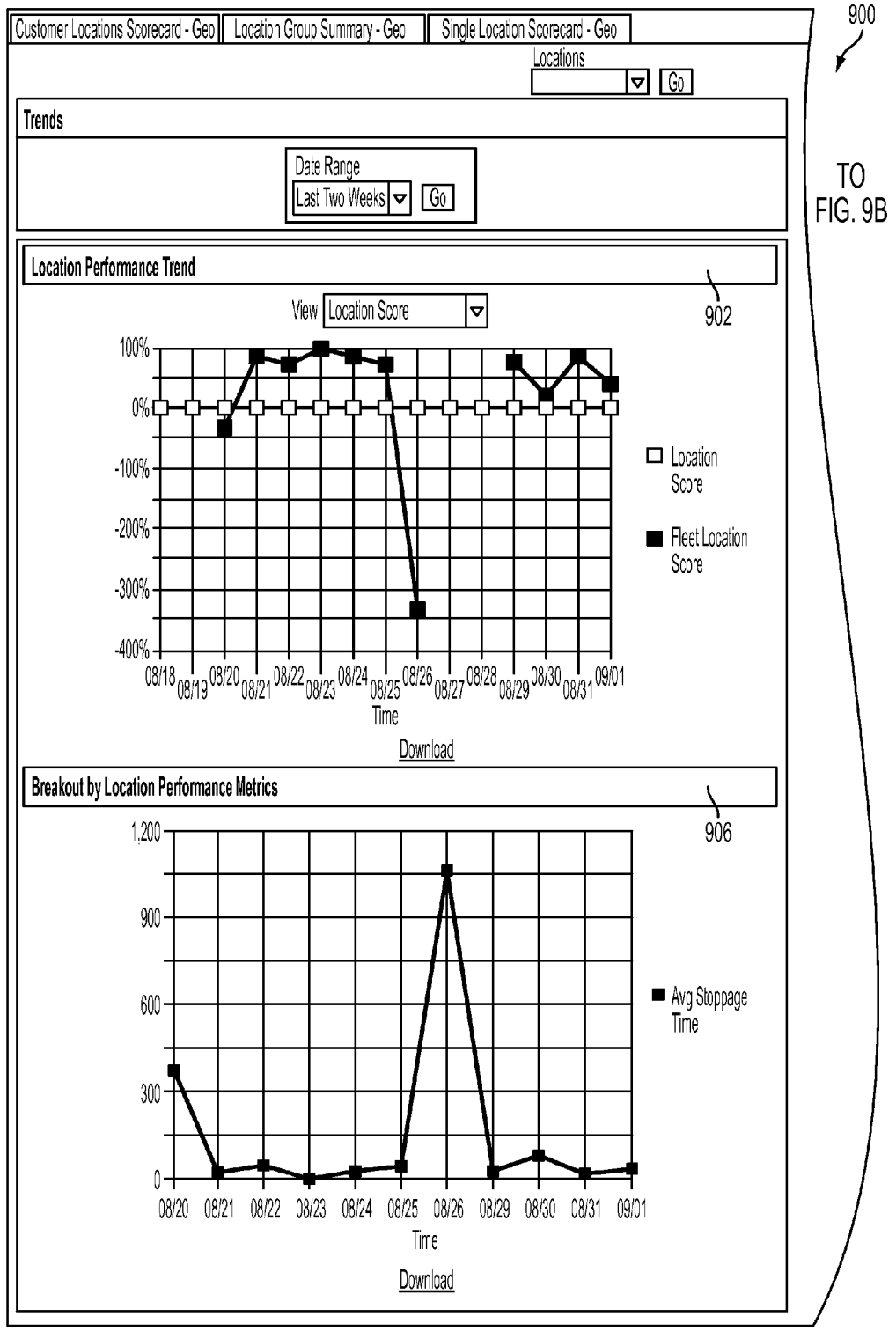
FIGS. 9A and 9B are a graphical illustration showing a location performance summary window provided by the analytics manager on the terminal device of FIG. 2.
Figure 9B:
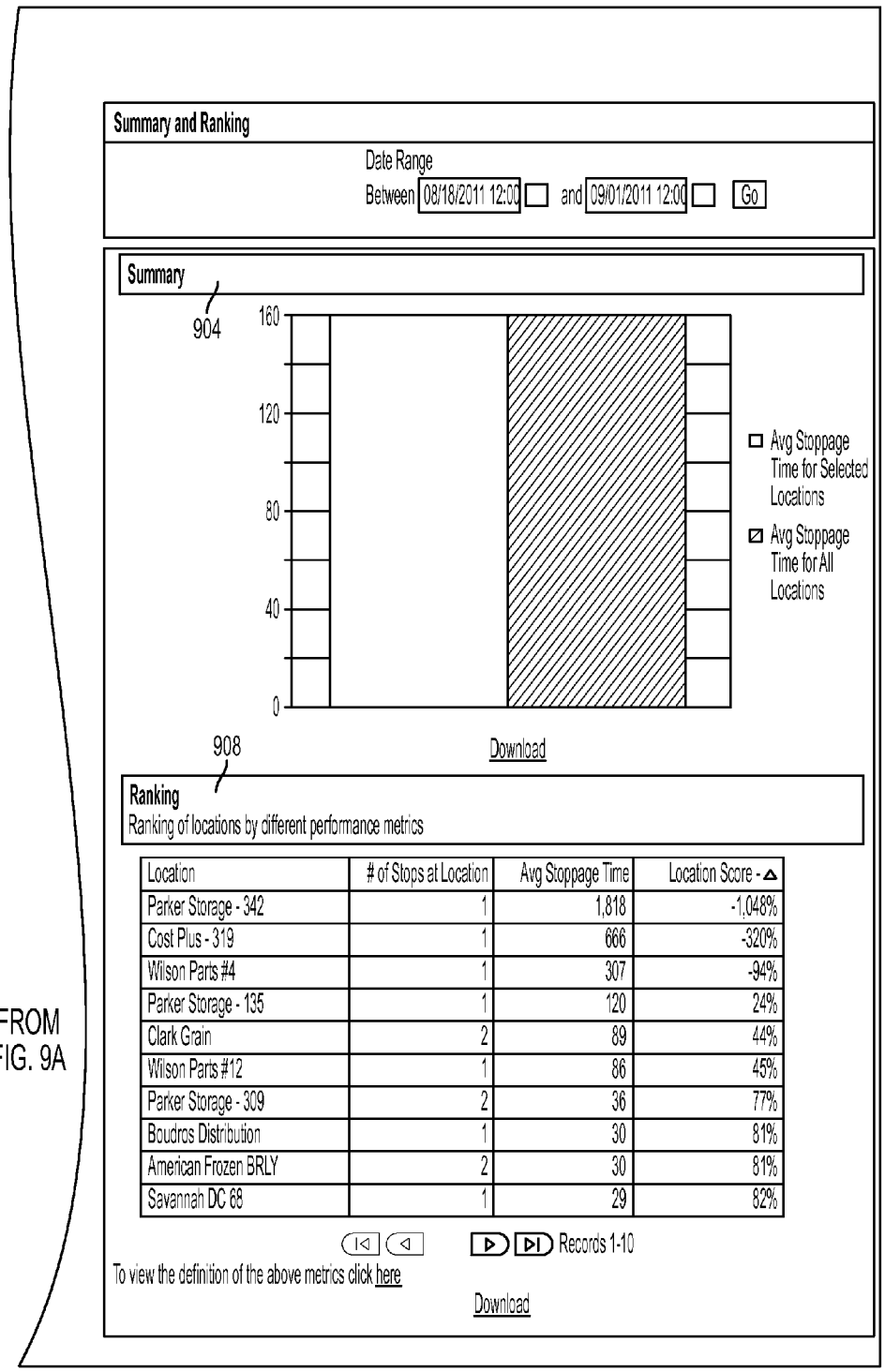

FIGS. 9A and 9B are a graphical illustration 900 showing a location performance summary window provided by the analytics manager 170 on the terminal device 174. The location performance summary window corresponds to the location performance view 404 shown in FIG. 4 and includes a location performance trend view 902, a summary view 904, a breakout by location performance metrics view 906 and a ranking view 908.

Figure 10:
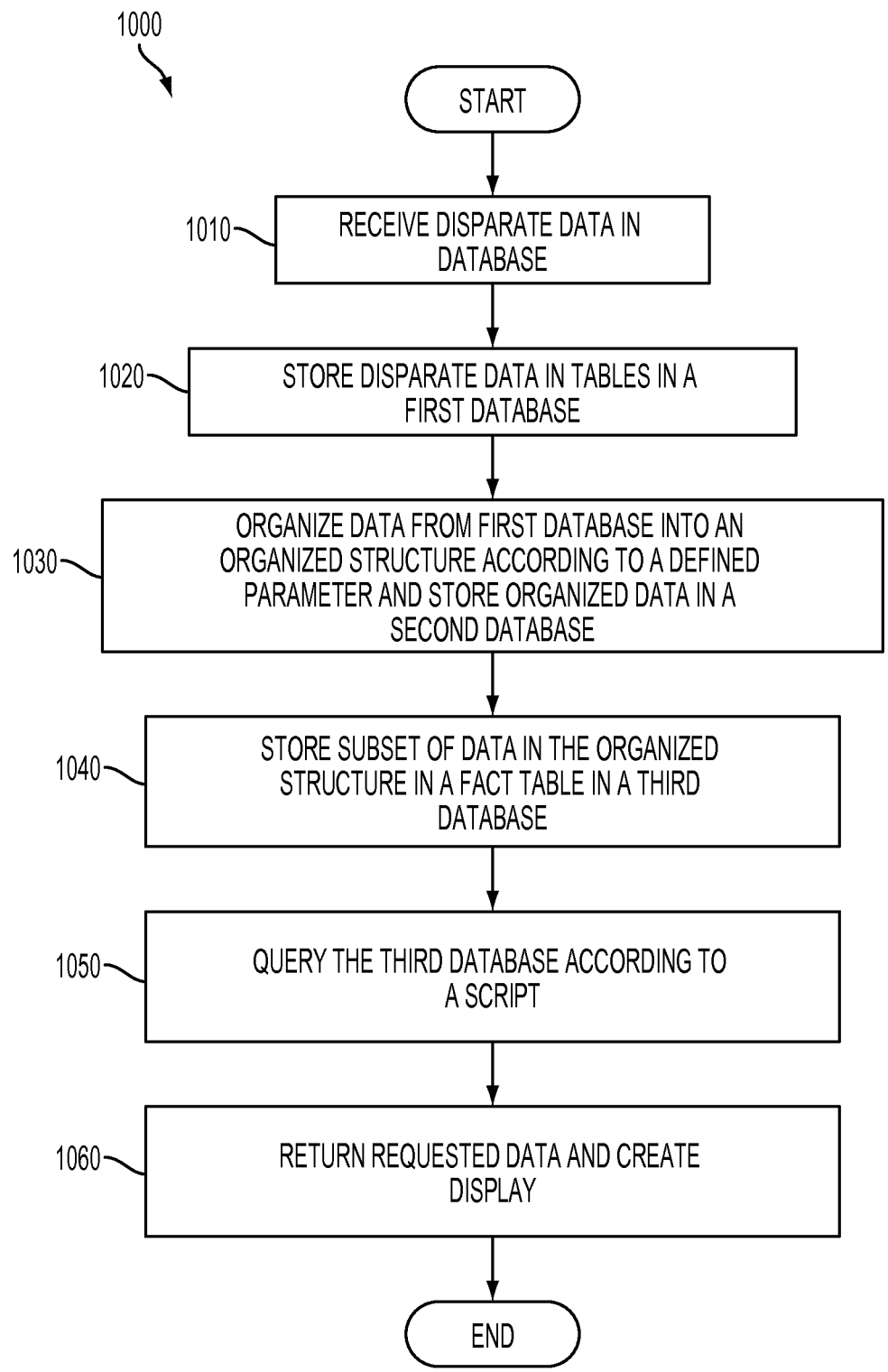
FIG. 10 is a flowchart illustrating an example of a method for collecting analyzing and displaying fleet performance data.

FIG. 10 is a flowchart 1000 illustrating an example of a method for collecting analyzing and displaying fleet performance data. The blocks in the flowchart can be performed in or out of the order shown, and in certain embodiments, can be performed in parallel. In block 1010 a plurality of data streams comprising disparate data are received by the stage 154.

In block 1020 disparate data is stored in the stage 154.

In block 1030, the data in the stage 154 is organized into an organized structure in the operational data store 156. This occurs as a result of a script that determines how the disparate data in the stage 154 is organized to populate a table in the ODS 156. As an example, the data in the ODS 156 is organized as a function of a defined parameter, such as in the context of driver "x" described above in the table 322 of FIG. 3.

In block 1040, a subset of the data in the table in the operational data store 156 is exposed and stored in a fact table in a third database. As an example, particular elements of data in the ODS are populated into the fact table 332 in the data mart 158 (FIG. 3).

In block 1050 the analytics manager 170 queries the data mart 158 according to a predefined script. The predefined script associates the subset of data according to the predefined parameter.

In block 1060, the data mart 158 provides the associated subset of data in the fact table 332 to the analytics manager 170. The analytics manager 170 creates the desired view and provides the desired view over the terminal device 174 from a perspective defined by the predefined parameter.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for collecting, analyzing and displaying fleet performance data performed on a system including a processor, comprising:
   receiving, from a plurality of vehicles, a plurality of data streams comprising disparate data associated with the plurality of vehicles;
   identifying a first data type, a second data type, and a third data type of the disparate data;
   storing the first data type in a first data store, the second data type in a second data store, and the third data type in a third data store;
   receiving, at a first database, the disparate data from the first data store, the second data store, and the third data store;
   storing, in real-time, the disparate data in the first database;
   organizing, via the processor, the disparate data stored in the first database into an organized structure in a second database, the data in the second database organized according to a predefined parameter;
   exposing, via the processor, a subset of data from the organized data in the second database;
   storing the subset of data in a third database;
   querying, via the processor, the subset of data in the third database according to a script, the script configured to associate the subset of data according to the predefined parameter; and
   providing the associated subset of data in the third database to an analysis engine configured to display the associated subset of data from a perspective defined by the predefined parameter,
   wherein the analysis engine is further configured to compute fleet metrics by aggregating information from the third database and industry metrics by aggregating information from the second database, compare the associated subset of data to the fleet metrics or the industry metrics, and display the comparison.

2. The method of claim 1, wherein the disparate data comprises vehicle-centric data and driver-centric data and the subset of data in the third database is presented from a vehicle-centric performance perspective.

3. The method of claim 1, wherein the disparate data comprises vehicle-centric data and driver-centric data and the subset of data in the third database is presented from a driver-centric performance perspective.

4. The method of claim 1, further comprising managing an association between vehicle-centric performance data and driver-centric performance data.

5. The method of claim 4, wherein a subset of any of the vehicle-centric performance data and the driver-centric performance data is compared against a larger sample of the vehicle-centric performance data and the driver-centric performance data to determine a performance metric of the subset of any of the vehicle-centric performance data and the driver-centric performance data.

6. The method of claim 5, wherein the comparison of the subset of any of the vehicle-centric performance data and the driver-centric performance data with industry data is customizable based on user input.

7. The method of claim 1, wherein the disparate data is reviewed over a period of time.

8. A system for collecting, analyzing and displaying fleet performance data, comprising:
- a plurality of data streams received from a plurality of vehicles comprising disparate data associated with the plurality of vehicles, wherein the disparate data includes a first data type, a second data type, and a third data type;
- a first data store for storing the first data type;
- a second data store for storing the second data type;
- a third data store for storing the third data type;
- a first database for receiving the disparate data from the first data store, the second data store, and the third data store and storing, in real-time, the disparate data;
- a second database for storing the disparate data in the first database in an organized structure, the data in the second database organized according to a predefined parameter;
- a third database for storing a subset of data exposed from the data in the second database;
- a script for querying the subset of data in the third database, the script configured to associate the subset of data according to the predefined parameter; and
- an analysis engine configured to display the associated subset of data from a perspective defined by the predefined parameter, wherein the analysis engine is further configured to compute fleet metrics by aggregating information from the third database and industry metrics by aggregating information from the second database, compare the associated subset of data to the fleet metrics or the industry metrics, and display the comparison.

9. The system of claim 8, wherein the disparate data comprises vehicle-centric data and driver-centric data and the subset of data in the third database is presented from a vehicle-centric performance perspective.

10. The system of claim 8, wherein the disparate data comprises vehicle-centric data and driver-centric data and the subset of data in the third database is presented from a driver-centric performance perspective.

11. The system of claim 8, wherein the analysis engine manages an association between vehicle-centric performance data and driver-centric performance data.

12. The system of claim 11, wherein a subset of any of the vehicle-centric performance data and the driver-centric performance data is compared against a larger sample of the vehicle-centric performance data and the driver-centric performance data to determine a performance metric of the subset of any of the vehicle-centric performance data and the driver-centric performance data.

13. The system of claim 12, wherein the comparison of the subset of any of the vehicle-centric performance data and the driver-centric performance data with industry data is customizable based on user input.

14. The system of claim 8, wherein the disparate data is reviewed over a period of time.

15. A system for collecting, analyzing and displaying fleet performance data, comprising:
- a plurality of data streams received from a plurality of vehicles comprising disparate data including a first data type, a second data type, and a third data type, the disparate data comprising vehicle-centric data and driver-centric data;
- a first data store for storing the first data type;
- a second data store for storing the second data type;
- a third data store for storing the third data type;
- a first database for receiving the disparate data from the first data store, the second data store, and the third data store and storing, in real-time, the disparate data;
- a second database for storing the disparate data in the first database in an organized structure, the data in the second database organized according to a predefined parameter;
- a third database for storing a subset of data exposed from the data in the second database;
- a script for querying the subset of data in the third database, the script configured to associate the subset of data according to the predefined parameter; and
- an analysis engine configured to display the associated subset of data from a perspective defined by the predefined parameter, the perspective chose from a vehicle-centric performance perspective and a driver-centric performance perspective, wherein the analysis engine is further configured to compute fleet metrics by aggregating information from the third database and industry metrics by aggregating information from the second database, compare the associated subset of data to the fleet metrics or the industry metrics, and display the comparison.

16. The system of claim 15, wherein the analysis engine manages an association between vehicle-centric performance data and driver-centric performance data.

17. The system of claim 16, wherein a subset of any of the vehicle-centric performance data and the driver-centric performance data is compared against a larger sample of the vehicle-centric performance data and the driver-centric performance data to determine a performance metric of the subset of any of the vehicle-centric performance data and the driver-centric performance data.

18. The system of claim 17, wherein the comparison of the subset of any of the vehicle-centric performance data and the driver-centric performance data with industry data is customizable based on user input.

19. The system of claim 15, wherein the disparate data is reviewed over a period of time.

* * * * *